United States Patent [19]
Bergmann et al.

[11] 3,974,955
[45] Aug. 17, 1976

[54] METHOD AND APPARATUS FOR WELDING MEMBERS TOGETHER

[75] Inventors: Werner J. Bergmann, Lower Burrell, Pa.; John A. Worden, Hope, Ind.

[73] Assignee: Aluminum Company of America, Alcoa Center, Pa.

[22] Filed: Dec. 5, 1974

[21] Appl. No.: 529,903

[52] U.S. Cl. ............................ 228/256; 228/43; 228/33
[51] Int. Cl.² .......................................... B23K 31/02
[58] Field of Search ......... 29/503, 499, 498, 498.5; 228/25, 26, 33, 36, 37, 43, 256, 257, 244, 240, 241, 238

[56] References Cited
UNITED STATES PATENTS

| | | | |
|---|---|---|---|
| 1,795,332 | 3/1931 | Deppeler | 40/2 |
| 3,860,062 | 1/1975 | McMurray et al. | 164/333 |

OTHER PUBLICATIONS
"Electroslag Welding" Metals Handbook, 8th Edition, vol. 6, pp. 383-394.

Primary Examiner—James L. Jones, Jr.
Assistant Examiner—Margaret Joyce
Attorney, Agent, or Firm—Teare, Teare & Sammon

[57] ABSTRACT

A method and apparatus for welding together two members such as relatively thick metallic plates. The plates are positioned vertically in the same plane and are spaced apart by a gap which is equal to the desired width of the seam or joint. A moving current of molten metal is caused to flow horizontally through the gap, starting at the bottom of the gap, until the plates are heated to a welding temperature, and then the flow is ceased to allow for weld solidification. For welding plates when the length of the weld is greater than the depth of the molten metal stream, the plates are moved downwardly simultaneously while continuing the flow of molten metal through the gap. The plates are moved at a rate which will allow for solidification of the weld metal until the gap is filled.

25 Claims, 10 Drawing Figures

METHOD AND APPARATUS FOR WELDING MEMBERS TOGETHER

BACKGROUND OF THE INVENTION

One method of joining together two members by the use of weld metal comprises the dropping of molten weld metal against the surfaces to be welded to preheat the same, with the molten metal flowing downwardly past the members to be joined and into a subjacent mold cavity, then dropping additional molten weld metal into a mold cavity closely surrounding the surfaces to be welded and communicating with the subjacent cavity to form the weld. Such method is illustrated and described in U.S. Pat. No. 1,795,332 issued Mar. 10, 1931, in the name of J. H. Deppeler. Characteristic of the method of this Deppeler patent is that the molten is obtained by an exothermic reaction, which creates the metal from its oxide and provides that metal at a high temperature by a rapid evolution of heat during the reaction. An example is the Thermit reaction.

SUMMARY OF THE INVENTION

The present invention provides a method and apparatus by means of which two members, such as relatively heavy plate sections, can be quickly supported in vertical position with a gap therebetween having a width of the desired seam or joint and then causing a moving current of molten metal to flow horizontally through the gap, starting at the bottom thereof, until the metal of the plate sections is heated by contact with the molten metal to a welding temperature. At such time, in the case of narrow plates, such as bus bars where the height of the weld is substantially equal to the depth of the molten metal stream, the flow is ceased to allow for weld solidification. Where, however, the height of the weld is greater than the depth of the stream, the plates are moved downwardly and simultaneously while continuing the flow of molten metal through the gap until the gap is filled with the weld metal. The rate of downward movement is correlated to the joining rate and temperature of the molten metal so as progressively to heat the plates as the weld metal fills the gap during the downward movement of the plates.

DESCRIPTION OF THE PREFERRED EMBODIMENT

Figure 1:
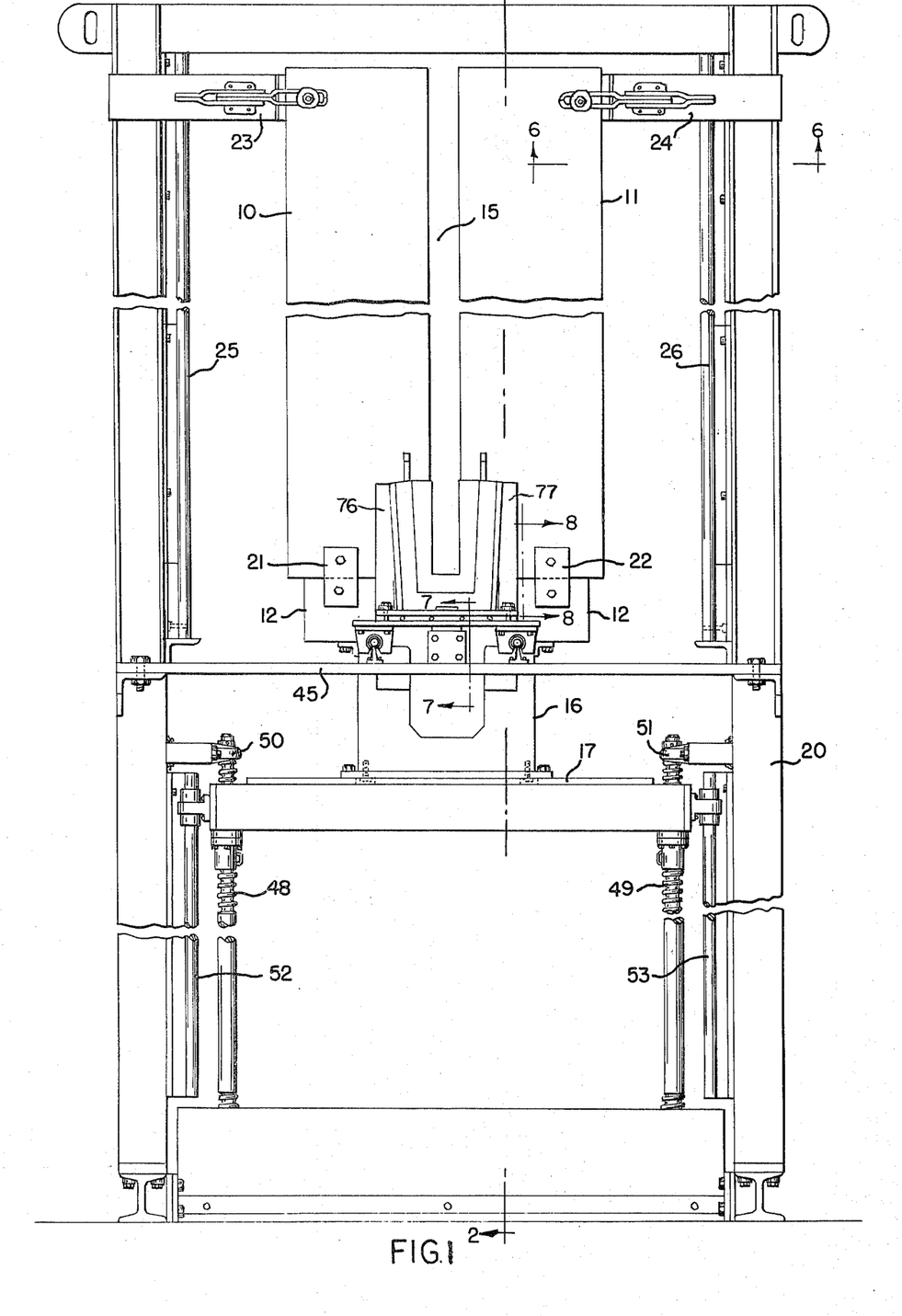
FIG. 1 is an end view of an apparatus for carrying out of the method of the present invention.

An apparatus for carrying out the present invention is illustrated in the drawings, wherein the members, such as heavy section plates to be welded, are indicated at 10 and 11 respectively, in FIG. 1, as being supported upon a starting block 12 in spaced relationship vertically to form a gap 15 along which the welded seam is to be made. The starting block may be supported by a standard 16 which is attached to a carriage 17, the latter of which is movable vertically within a stationary frame 20. The plates may be held in vertical position by a set of lower clamps 21 and 22 and a set of upper clamps 23 and 24. The lower clamps are fastened to the starting block 12, while the upper clamps are movable vertically along guide rails 25 and 26, respectively.

The seam or weld between the plates 10 and 11 is formed by causing a moving current of molten metal to flow horizontally through the gap 15, starting at the bottom of the gap and then by moving the plates downwardly and simultaneously as the weld metal fills the gap, until the entire seam opening is filled with metal. To contain the molten metal within the gap at the start of the operation, the starting block 12 bridges the gap between the plates and supports the molten metal at the start of the welding operation.

Figure 2:
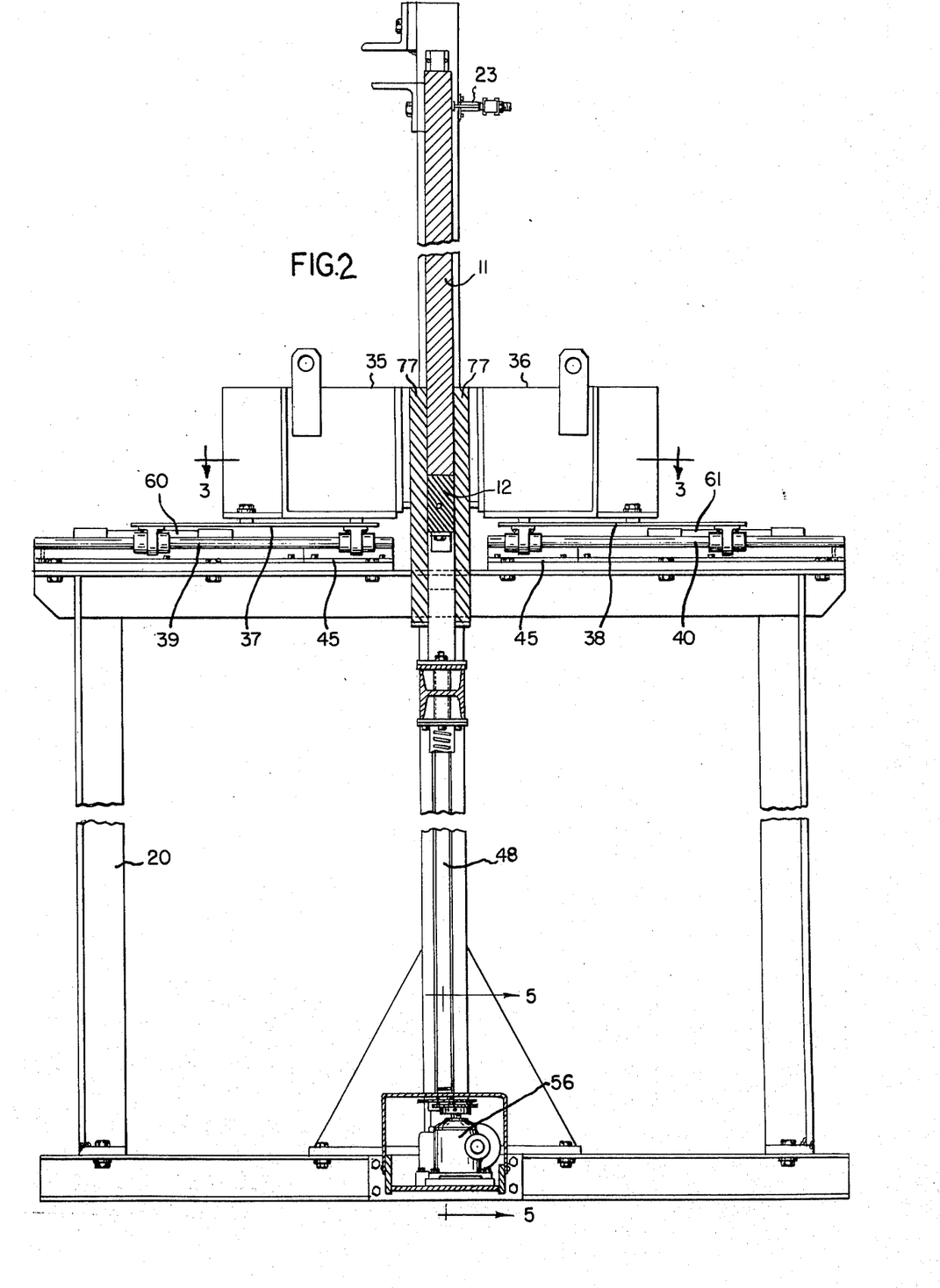
FIG. 2 is a vertical section taken on a plane indicated by the line 2—2 in FIG. 1.

Metal, which has been endothermically heated to a molten state, is introduced into the gap through an inlet trough 35 from a source of molten metal such as a crucible, in a furnace, while the excess metal is discharged through a trough 36. The bottom surfaces of the troughs engaged by the flowing metal are substantially in the same plane as the top surface of the block 12 at start-up. The troughs are shown as being mounted upon carriages 37 and 38, respectively (FIG. 2), each of which is movably mounted upon spaced parallel guide bars 39 and 40 respectively, the latter of which are supported upon spaced cross beams 45 which are carried by the frame 20.

The term "endothermic" or endothermically as used herein means the heating of a charge of welding material in a crucible, using a source of heat external to the charge, until the charge is melted, and then, with the charge molten, flowing it between the members to be joined. The necessary heat input to the edge surfaces of the members to be welded is obtained simply by flowing the molten charge past the edge surfaces at a sufficient rate. It has been found that a suitable molten metal flow velocity through the gap is about 1.5 feet per second.

To move the carriage 17 vertically with reference to the frame 20, the carriage may have threaded apertures adjacent the ends thereof through which threaded shafts 48 and 49 extend. The shafts are journaled at the upper ends in bearings 50 and 51 respectively, and the carriage is guided in such vertical movement by guide bars 52 and 53, respectively. The lower ends of the shafts are journaled in bearings, such as that indicated at 55 in FIG. 5. An electric motor 56 which is mounted on the base 59 of the frame may be connected to the respective shafts by sprocket chains 57 and 58, respectively.

Figure 7:
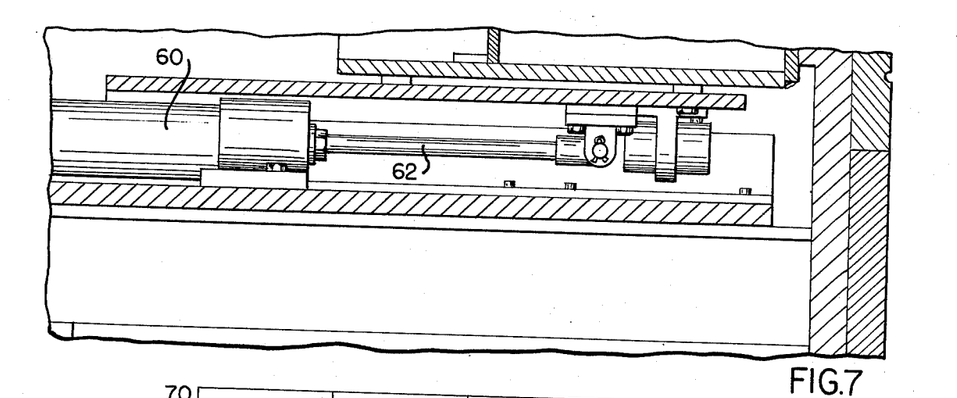

The troughs may be moved toward and away from each other with respect to the frame 20 so as to accommodate plates of various thickness which are to be welded and to maintain proper contact with the plates. The motive power for moving the troughs may comprise air cylinders 60 and 61 (FIG. 2) which are mounted on the frame and are operatively connected to the troughs 35 and 36, respectively, by piston rods 62 with only one shown in FIG. 7.

To restrain the flow of molten metal laterally, adjacent the faces of the plates to be joined, the end of each trough terminates in side dams, indicated in general at 75, each of which has wings 76 and 77 adapted to engage the faces of the respective plates to be welded. Each side dam may be resiliently adjustable, as at 78, with reference to the plates so as to assure a sliding contact between the wings thereof and the faces of the metal plates as the plates are moved downwardly during the welding operation. If desired, the pressure exerted against the piston rods 62 may be adjusted and maintained so as to hold the troughs and also the side dams in proper position for preventing the lateral escape of molten metal during the welding operation.

The side dams are useful in obtaining a satisfactory surface quality on the exterior of the weld. The dams affect the solidification rate along the length of the weld, and because of the sliding friction between the weld surfaces and the side dams, lubrication is desirable between them and the parent material to prevent seizing between the side dams and the plates, and to prevent a tearing of hot, and thus soft, weld metal out of the weld zone. The side dams have been constructed of graphite (Union Carbide Company grades ATJ and CS), from water-cooled Meehanite, and from water-cooled copper. Watercooled aluminum is another example. The best weld surface appearance has been produced by using grade ATJ graphite aids dams. The vertical dimension of the side dams along the weld gap is correlated, in the method of the invention, with the rate at which the plates are moved relatively downwards, by this arrangement the lower edge of the side dams will always be below the weld metal solidification interface which forms in the weld gap 15 as the plates are moved downwards to move new portions of the weld gap far enough away for the heat-input zone of horizontally flowing metal that solidification can occur.

Figure 6:
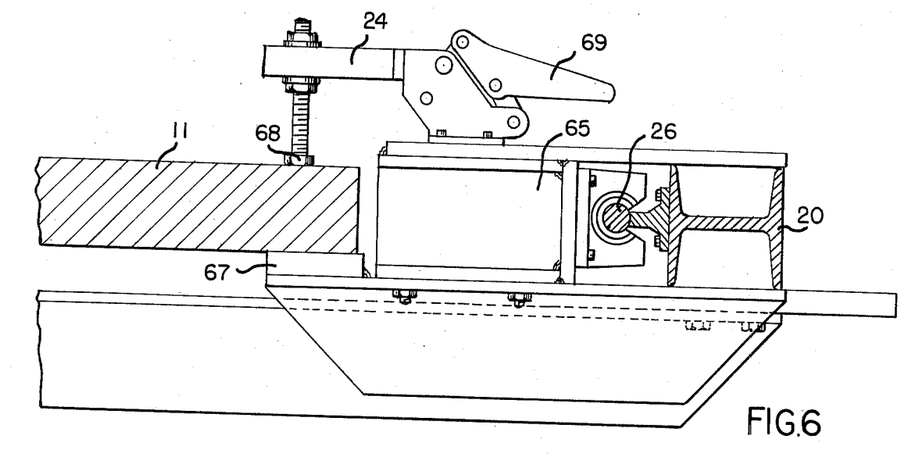

In FIG. 6, the upper clamping member 24 is shown as being mounted on a carriage 65 which is guided on the vertical bar 26 and which carries a stationary jaw 67 and the movable jaw 68. The stationary jaw engages one side of the plate to be welded, and the movable jaw engages the other side of the plate and is provided with a quick opening, hand actuated lever 69.

Figures 5, 8, 10:
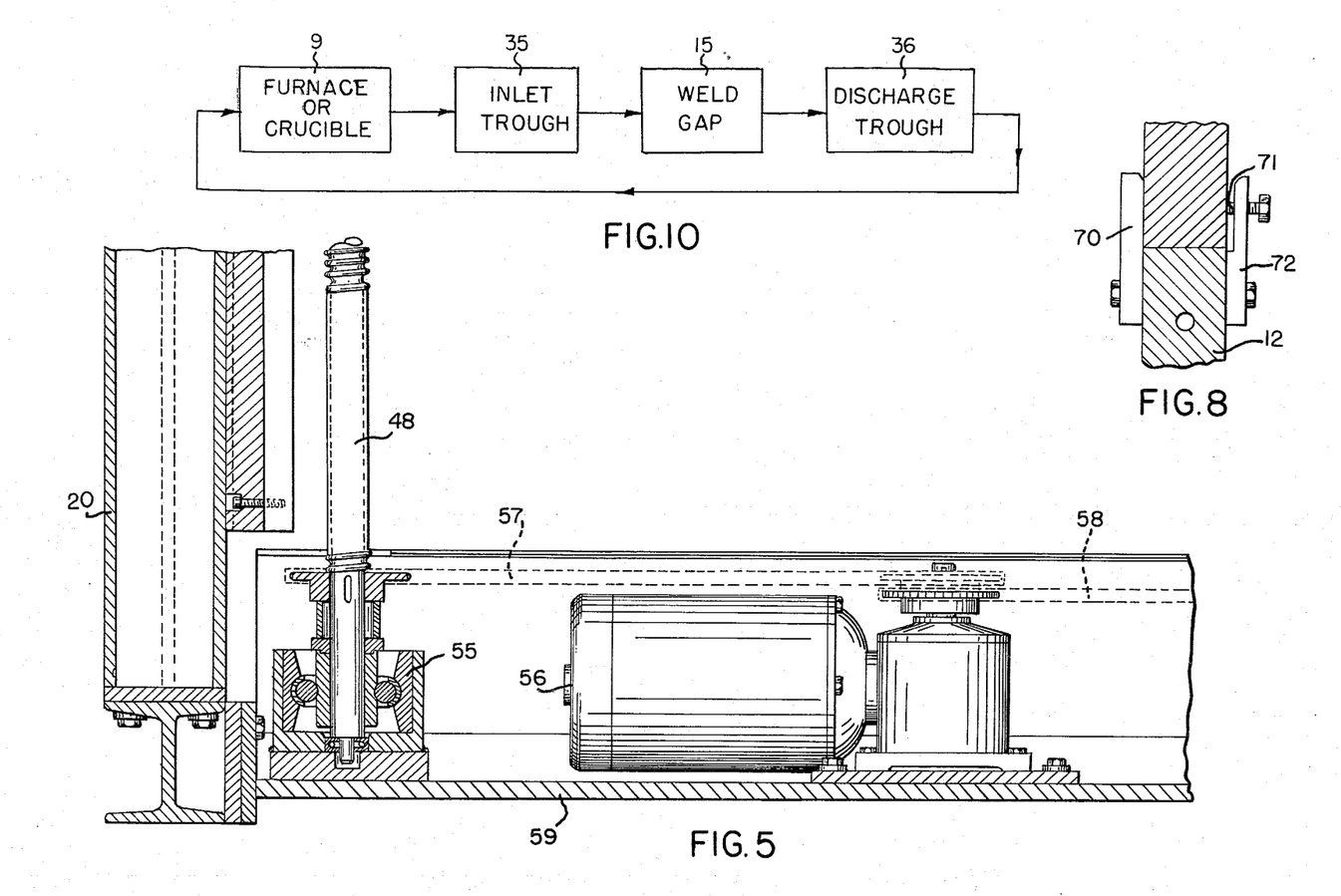
FIG. 5 is a section taken on a plane indicated by the line 5—5 in FIG. 2, but on a larger scale.
FIGS. 6, 7 and 8 are sections taken on planes indicated by the corresponding numbered lines in FIG. 1.
FIG. 10 is a diagram showing the flow of metal from the source of supply to the weld gap and back to the source of supply.

The lower clamp is shown in FIG. 8 as comprising a stationary jaw 70, which is attached to the supporting block 12 and a movable jaw 71 which is carried adjustably by an arm 72, the latter of which is attached to the side of the supporting block.

Figure 3:
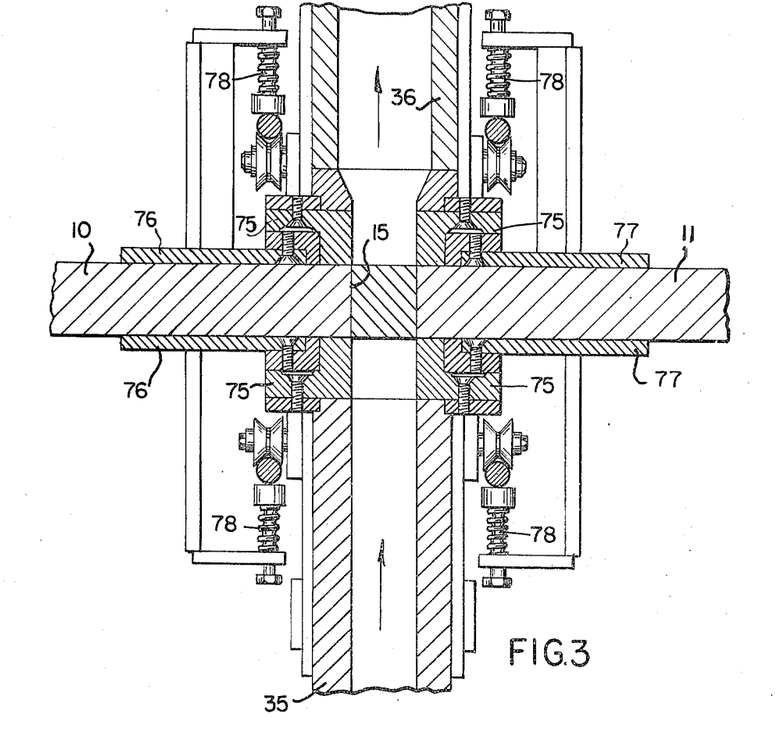
FIG. 3 is a horizontal section taken on a plane indicated by line 3—3 of FIG. 2.
Figure 4:
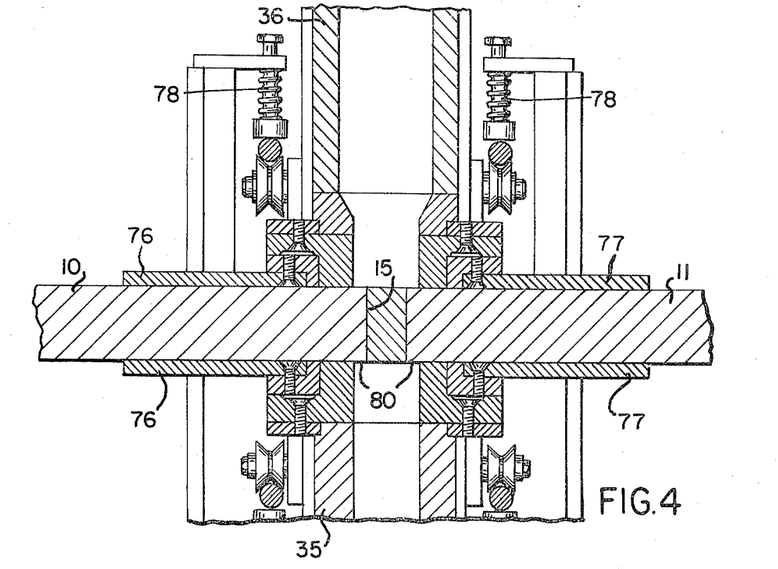
FIG. 4 is a section similar to that of FIG. 3 but showing a modified form of the same configuration between the plates to be welded.

In FIG. 3 the spacing between the winds 76 and 77 of the side dam is equal to the width of the gap 15 between the plates. In FIG. 4, however, the width of the gap 15 is smaller than the spacing between the wings of the side dams, thereby providing an overhang, indicated at 80, of the plates with respect to the opening through which the molten metal flows. Thus, for example, if the gap 15 is ½ inch and the distance between the side dams is 1 inch, then the plate overhang 80 would be ¼ inch. FIG. 10 illustrates the concept of saving heat in the present invention by recycling metal, which has already flowed through the gap 15, back to flow through the gap again.

Figure 9:
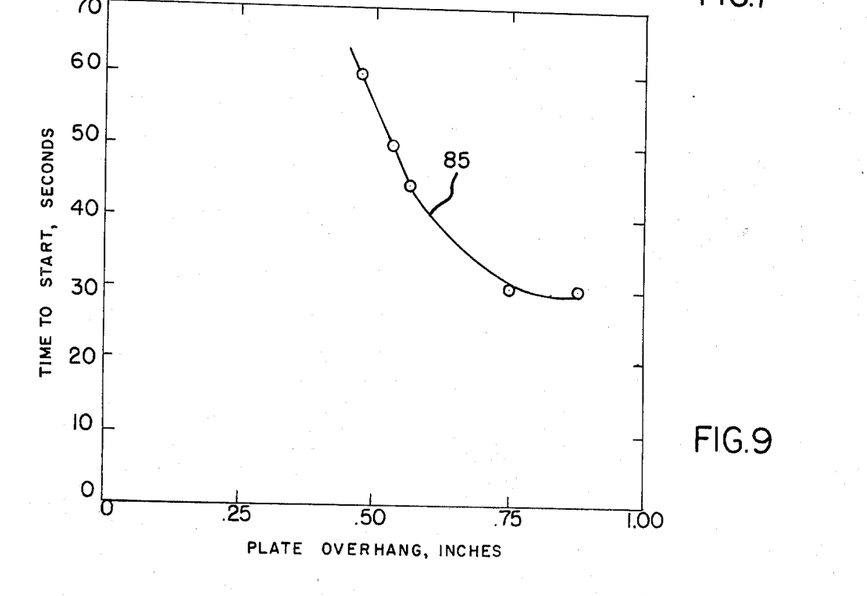
FIG. 9 is a chart showing the relationship between the plate overhang in inches and the time in seconds of metal circulation through the plate gap before the plate movement is initiated.

There is a relationship between the extent of the plate overhang and the time during which the metal flows through the gap between the plates before the downward movement of the plates is initiated. Such delay allows the molten metal to heat the opposing edges of the plates until they are melted and are at a temperature that will provide a satisfactory weld between the weld metal and the plates. In FIG. 9 such relationship is illustrated in a chart wherein the extent of the plate overhang is plotted against the time of metal flow from the commencement of the flow to the start of the downward movement of the plates. In such chart, the plate overhang is expressed in fractions of an inch while the time to start is expressed in seconds. On such chart the curve 85 represents the results of an experimental determination which shows that quicker melting occurs with the larger overhang. The importance of such phenomenon is related to the fact that, with faster initial melting, less metal is required to be circulated through the welding zone, thereby resulting in a saving in the amount of metal used in the process.

A further important feature of the plate overhang is that it affects the uniformity of lateral penetration with respect to the center line of the weld. Thus, if one of the weld plates overhangs more than the other, the welding or filler metal will penetrate excessively on one side of the weld. This reduces the local metal velocity against the opposing plate surface and can result in lack of edge surface fusion and failure to form a welded bond. In the preferred embodiment, the plate overhang should be adjusted to within plus or minus 1/16 inch between the two plates. The data appearing on the chart FIG. 9 was obtained with a plate gap of 0.375 inch between aluminum plates each being 2.75 inches in thickness and with a metal inlet area of 3.28 sq. inches. The composition of the plates was that which is known in the art as 5083 aluminum-magnesium alloy and the composition of the filler or welding metal was that which is known in the art as 5083 filler metal.

The joining rate achieved with the process of the invention is controlled by the metal temperature, the metal inlet area and the spacing between the plates. It has been found that with a given metal temperature two extremes exist with regard to the joining rate. Thus, at a temperature of 1.540° F, using a metal inlet area of 3.28 sq. inches and a plate thickness of 2.75 inches, the joining rate for a gap of 0.75 inches between the plates is 5 inches per minute, whereas at the same temperature with a gap of 1 inch, the joining rate is 4.5 inches per minute. In general, if too slow a joining rate is used with a given metal temperature, excessive penetration into the parent metal will occur, and if the lateral weld penetration becomes excessive, melting will occur behind the side dams and bleed-out will occur. On the other hand, if too fast a joining rate occurs for a given metal temperature, then bonding will not occur on one or both plates.

The shape of the channel, or gap, between the plates to be welded affects the initiation of the melting as well as the final shape of the weld zone. This condition appears to be related to the orifice effect produced between the two plate sections. For example, a convergent channel appears to begin melting before a straight-sided channel or a divergent channel. A divergent channel requires a longer initial circulation time through the weld zone before the commencement of the melting. Generally, slower joining rates are achieved with a divergent channel than with either a straight-sided or convergent channel. The straight-sided channel, however, is less costly to prepare. While the molten metal is in the crucible, it may be conventionally fluxed with chlorine for the removal of hydrogen. Additionally, the molten metal may be treated while it is flowing in the stream from the crucible to the plates to be welded, by diffusing inert gas, such as argon, or active gas, such as chlorine, into the stream. Suitable techniques of introducing the gas into the molten metal are set forth in U.S. Pat. No. 3,039,864 and in No. 3,839,019.

EXAMPLE I

Aluminum alloy type 5083 plates each having a thickness of 2¾ inches, a width of 6 inches, and a length of 24 inches were welded together using the method and apparatus of the present invention. The surfaces to be welded were provided with a 6° convergent taper so that the weld gap became narrower in the direction of weld metal flow. On the outlet side of the gap, the spacing between the plates was ⅜ inch. The temperature of the weld metal on the inlet side of the weld was 1,540° F, and the weld metal used was aluminum alloy type 5083. The plate overhang was about 9/32 inch and the flow rate of the aluminum welding metal through the weld gap was 3,810 lbs. per hour. The metal flowed for about 20 seconds until melting of the parent metal could be sensed across the weld gap by using an iron probe. The lowering mechanism was started after such 20 second period, and the plates were pulled downwardly simultaneously between the side dams at a velocity of 3½ inches per minute. During such operation, the metal stream substantially filled the port on the inlet side of the dam. The inlet dimensions of such port were 1¾ inches in height for the sides, and 1⅞ inches across for the bottom lip. A satisfactory weld joint was obtained.

EXAMPLE II

In Example II, the same plate dimensions and type of plate were used as in Example I, but the surfaces to be welded had a straight gap with the spacing of ⅜ inch on both the inlet and outlet sides of the gap. The temperature of the weld metal on the inlet side of the weld was 1,460° F, and the plate overhang was about ¾ inch. The flow rate of the welding metal through the gap was about 4,000 lbs. per hour, and in about 30 seconds the melting of the parent metal could be sensed across the weld gap by the use of an iron probe. The plates were moved downwardly at a velocity of about 3 inches per minute, and the resulting weld joint was satisfactory. The tensile strength, an important measure of weld quality in thick plate applications, of the joint was 36,000 lbs. per square inch. The longitudinal axis of the tensile specimens was, with respect to FIG. 1, horizontal and parallel to the plane of the figure.

EXAMPLE III

In Example III, aluminum alloy type 5083-0 plates each having a thickness of 2¾ inches, a width of 12 inches, and a length of 48 inches were welded together, using the method and apparatus of the present invention. The surfaces to be welded were provided with a straight channel. The surfaces to be welded were provided with a straight channel, and the gap between the plates was ½ inch. The temperature of the weld metal in the crucible of the furnace was between 1,450° F and 1,510° F, and there was about 5000 pounds of metal in the crucible at the start of welding. The temperature of the metal at the inlet side of the gap was between 1410° F and 1460° F, and the temperature of the metal at the outlet side of the gap was between 1310° F and 1360° F, and the weld metal used was aluminum alloy type 5183. The side dams were made of graphite and the bottom plate comprised water cooled Meehanite. The time of starting the plates downwardly was 10 seconds after the metal started to flow through the gap, and the joining rate was between 2.75 inches per min., and 3.0 inches per min. The welding time was 8 min. 21 seconds. The plate overhang was ¼ inch, and the inlet port was 1 inch wide and 7.5 inches high. In this example, the metal was fluxed for ½ hour in the furnace crucible by letting a slow bubbling of chlorine rise through the melt from a submerged lance, then treated with an argon flow rate of 90 standard cubic feet per hour (SCFH) in a device as pictured in FIG. 1 of U.S. Pat. No. 3,039,864 issued June 19, 1962 in the name of P. D. Hess et al, and finally treated with a mixture of argon gas and chlorine gas, at a flow rate of, respectively, 100 SCFH and 2 SCFH in a device as pictured in FIG. 1 of U.S. Pat. No. 3,839,019 issued Oct. 1, 1974 in the name of M. J. Bruno et al.

EXAMPLE IV

Aluminum alloy type 5083-0 plates, each having a thickness of 2.75 inches, a width of 12 inches, and a length of 48 inches, were welded together using the method and apparatus of the present invention. The surfaces to be welded were spaced apart so as to form a ½ inch gap. The temperature of the weld metal on the inlet side was about 1390° F, and the temperature on the outlet side of the gap was between 1310° F and 1320° F. The temperature of the metal in the crucible of the furnace was between 1450°F and 1460° F, and the weld metal used was aluminum alloy type 5085. The plate overhang was 1¼ inches. The side dam comprised grade CS graphite, and the bottom plate was water cooled Meehanite. The weld area was ½ × 2.75 inches, and the joining rate was 2.75 inches per minute. The time between the start of the metal flow and the start of the downward movement of the plates was 12 seconds. The metal in the crucible was fluxed with chlorine for ½ hour, and the metal in the stream after leaving the crucibles was fluxed with argon gas at the rate of 90 SCFH in the device of U.S. Pat. No. 3,039,864 as mentioned above. Six specimens of welds produced in this example averaged 39,450 lbs. per sq. inch tensile strength, and the welds were satisfactory.

While the specific disclosure above relates particularly to the welding of plates, Hall-Heroult alumina electrolysis cell bus bars, or rods in general, may also be welded according to the invention. Also, the particular references to thick plate is made, because that is the most difficult application of the invention, so that the invention is applicable to thin plate or sheet as well. Preferred applications of the invention are for welding aluminum, plastics, copper, and other similarly low-melting metals, alloys and materials.

1. A method of welding together two members placed with the edge surfaces to be joined in mutually facing relationship and separated by a weld gap, comprising, endothermically heating a material to the molten state, flowing the molten material through the weld gap between the edge surfaces for heating the members with the molten material to cause melting of the edge surfaces, and then causing the flow of molten material to allow for weld solidification.

2. A method according to claim 1 wherein, the molten material flow is confined at any one time to a portion of the edge surfaces to be joined, and wherein
the ceasing of flow is accomplished by relatively moving the molten material flow continuously away from a weld metal solidification interface.

3. A method according to claim 1 wherein the members to be joined comprise metallic plates and wherein
the plates are supported in a common vertical plane with the edges to be joined being spaced apart by a distance equal to the width of the desired joint and wherein
the stream of molten material passes through the gap adjacent the bottom thereof and wherein
the plates are moved simultaneously downwardly while continuing the flow of molten metal through the gap until the gap is filled with metal.

4. A method according to claim 3 comprising
moving the plates downwardly at a rate which is correlated to the rate of heating of the plates so as progressively to fill the gap with metal and weld the plates together as they are moved downwardly through the stream of molten material.

5. A method according to claim 3 comprising
closing the bottom of the space between the plates so as to support the molten material as it flows from one side of the plates to the other at the start of the joining operation and
moving the closure downwardly and simultaneously with the plates to cause the molten material to rise relatively in the gap between the plates.

6. A method according to claim 5 comprising
aligning an inlet and a discharge trough for the stream of molten material on opposite sides of the space between the plates, and
positioning the closure for the bottom of the space in registration with the bottom of the respective troughs at the start of the joining operation.

7. A method according to claim 1, wherein
the molten material flows through the weld gap at a rate of about 1.5 feet per second.

8. A method according to claim 1, comprising
recycling material, which has already flowed through the weld gap, back to flow through the weld gap again.

9. A method of welding together two members placed with the edge surfaces to be joined in mutually facing relationship and separated by a weld gap, comprising,
arranging the members so that the gap extends vertically,
heating a material to the molten state,
flowing the molten material horizontally through the weld gap between the edge surfaces for heating the members with the molten material to cause melting of the edge surfaces, and
then ceasing the flow of molten material to allow for weld solidification,
while confining the molten material flow at any one time to a portion of the edge surfaces to be joined, and
while accomplishing the ceasing of flow by relatively moving a weld material solidification interface continuously downwards, away from the horizontal flow of molten material.

10. Apparatus for welding two members together comprising,
a support,
a carriage mounted on the support for movement vertically with reference thereto.
means on the carriage for supporting two members to be joined with the edges to be joined spaced apart a distance equal to the width of the desired joint,
means for moving the carriage and the members vertically with reference to the support,
a trough mounted on the support for conveying a stream of molten material horizontally into the space between the members,
a second trough for discharging excess molten metal which is not used for making a joint between the members,
means mounted on the carriage for closing the bottom of the space between the members,
said closing means comprising a bridge for metal flowing from one trough to the other at the start of the joining operation.

11. Apparatus according to claim 10 comprising,
means for sealing the respective members against leakage of molten metal laterally as the members are moved downwardly during the joining operation.

12. Apparatus according to claim 11 wherein,
the sealing means are mounted on the troughs and engage the members and seal them against leakage by frictional engagement therewith.

13. Apparatus according to claim 10, wherein
means are provided for moving the troughs towards and from each other with respect to the support, to accommodate variations in the thickness of the members to be joined.

14. Apparatus according to claim 10, wherein
the supporting means on the carriage includes clamping devices for engaging the members in the upper and lower regions thereof respectively, and
wherein said clamping devices are releasable for removing the joined members at the completion of the welding operation.

15. Apparatus for welding two members together comprising,
means for supporting the members to be joined with the edges to be joined spaced apart a distance equal to the width of the desired joint,
a trough disposed on one side of the members for conveying a stream of molten material horizontally into the space between the members,
a second trough disposed on the side of the members opposite from the first trough for receiving and conveying the stream of molten material horizontally after it passes through the space between the members, and
means for closing the bottom of the space between the members while the stream of molten metal is flowing through the troughs.

16. An apparatus according to claim 15 wherein,
means are provided for moving the troughs toward and from each other to accommodate variations in the thickness of the members to be joined.

17. Apparatus according to claim 15, including
dam means mounted on each of said troughs adapted to engage said members for sealing them against leakage of said molten material.

18. Apparatus according to claim 17, wherein said dam means are disposed on opposite sides of the space between said members, and the distance between said dam means being greater than the corresponding distance between said members to provide an overhang condition in respect to the flow of molten material through the space between said members.

19. A method for welding together two members placed with the edge surfaces thereof to be joined in mutually facing relationship and separated by a weld gap, comprising, arranging said members so that said gap extends in a generally vertical direction in relation to the flow of a molten weld metal with the gap having a width generally corresponding to the width of the weld joint to be formed, endothermically heating a metallic weld material to a molten condition, flowing the molten weld metal generally horizontally through said gap from one side to the other to fill said gap and at a rate sufficient to melt said edge surfaces for welding while bridging said gap with a closure means adjacent the bottom of said members, and then solidifying the molten weld metal in said gap to provide the desired weld joint.

20. A method according to claim 19, comprising moving said members generally simultaneously downwardly while continuing said flow of molten weld metal generally horizontally through said gap, and retaining said flow of molten weld metal at its initial level until said gap is substantially filled with solidified weld metal.

21. A method according to claim 19, comprising restraining the flow of said molten weld metal laterally adjacent the edge surfaces of said members by oppositely disposed side dam means.

22. A method according to claim 21, wherein the spacing between said side dam means is greater than the corresponding gap width so as to provide an overhang condition in respect to the flow of said molten weld metal through said gap to facilitate faster initial melting of the edge surfaces of said members.

23. A method according to claim 22, comprising providing a predetermined time delay before commencement of movement of said members downwardly after commencement of said flow of molten weld metal through said gap.

24. A method according to claim 19, wherein said members comprise thick aluminum plates.

25. A method according to claim 20, comprising correlating the vertical dimensions of said dam means along the gap in relation to the rate in which said members are moved downwardly so that the lowermost edges of said dam means are maintained below the weld metal solidification interface which forms in the weld gap.

* * * * *

UNITED STATES PATENT AND TRADEMARK OFFICE
CERTIFICATE OF CORRECTION

PATENT NO. : 3,974,955
DATED : August 17, 1976
INVENTOR(S) : Werner J. Bergmann and John A. Worden It is certified that error appears in the above-identified patent and that said Letters Patent are hereby corrected as shown below:

Column 1, line 17, after "molten" add --metal--.

Column 1, line 56, change "same" to --seam--.

Column 3, line 54, change "winds" to --wings--.

Column 4, line 43, change "1.540°" to --1,540°--.

Column 5, lines 61 and 62, delete "The surfaces to be welded were provided with a straight channel." (First occurrence)

Column 6, line 44, change "crucibles" to --crucible--.

Column 7, line 1, change "causing" to --ceasing--.

Signed and Sealed this

Eleventh Day of January 1977

[SEAL]

Attest:

RUTH C. MASON
Attesting Officer

C. MARSHALL DANN
Commissioner of Patents and Trademarks